United States Patent
Ruud et al.

(10) Patent No.: US 8,043,418 B2
(45) Date of Patent: Oct. 25, 2011

(54) GAS SEPARATOR APPARATUS

(75) Inventors: James Anthony Ruud, Delmar, NY (US); Michael John Bowman, Niskayuna, NY (US); Kalya Vijaya Sarathy, Bangalore (IN); Mohan Manoharan, Niskayuna, NY (US); Anthony Yu-Chung Ku, Rexford, NY (US); Vidya Ramaswamy, Niskayuna, NY (US); Patrick Roland Lucien Malenfant, Clifton Park, NY (US)

(73) Assignee: General Electric Company, Niskayuna, NY (US)

(*) Notice: Subject to any disclaimer, the term of this patent is extended or adjusted under 35 U.S.C. 154(b) by 1011 days.

(21) Appl. No.: 11/608,292

(22) Filed: Dec. 8, 2006

(65) Prior Publication Data

US 2008/0134895 A1 Jun. 12, 2008

(51) Int. Cl.
*B01D 53/22* (2006.01)

(52) U.S. Cl. .............. 96/4; 95/43; 96/14; 454/237

(58) Field of Classification Search .......... 96/4–14; 95/43; 454/173–183, 237–253
See application file for complete search history.

(56) References Cited

U.S. PATENT DOCUMENTS

| | | | |
|---|---|---|---|
| 5,744,035 A | 4/1998 | Geus et al. | |
| 6,319,428 B1* | 11/2001 | Michot et al. | 252/500 |
| 6,579,343 B2 | 6/2003 | Brennecke et al. | |
| 6,793,711 B1 | 9/2004 | Sammells | |
| 7,669,719 B2* | 3/2010 | Ramaswamy et al. | 210/490 |
| 2003/0080477 A1* | 5/2003 | Merrill et al. | 264/637 |
| 2003/0222015 A1 | 12/2003 | Oyama et al. | |
| 2005/0154247 A1 | 7/2005 | Jong et al. | |
| 2005/0241477 A1 | 11/2005 | Mundschau et al. | |
| 2005/0266227 A1* | 12/2005 | Ku et al. | 428/304.4 |
| 2006/0013759 A1 | 1/2006 | Jiang et al. | |

FOREIGN PATENT DOCUMENTS

| | | |
|---|---|---|
| EP | 1661616 B1 | 5/2006 |
| WO | WO2006105771 A1 | 10/2006 |
| WO | WO2007037933 A2 | 4/2007 |

OTHER PUBLICATIONS

Yaws et al. (1999). Chemical Properties Handbook. McGraw-Hill.*
Geankoplis (Transport Processes and separation Process Principles), 4th Ed., Prentice Hall, pp. 840-841, 2003.*
Giancoli (Physics for Scientists and Engineers), 3rd Ed., Prentice Hall, table 19-4 , 2000.*
Avallone et al. (Marks' Standard Handbook for Mechanical Engineers, 11th Edition, Table 4.2.29, McGraw-Hill.*
Webster's Third New International Dictionary, Unabridged, 1993.*
Licari et al. (Adhesives Technology for Electronic Applications—Materials, Processes, Reliability, 2005 William Andrew Publishing) table 2.6.*
European Search Report dated May 21, 2008.

* cited by examiner

*Primary Examiner* — Jason M Greene
*Assistant Examiner* — Anthony Shumate
(74) *Attorney, Agent, or Firm* — Paul J. DiConza

(57) ABSTRACT

An apparatus for separating at least one component from a mixture of a plurality of chemical species is provided. The apparatus comprises a membrane structure comprising a plurality of pores disposed within a matrix material to allow mass transport from a first surface of the membrane structure to a second surface of the membrane structure. The matrix material has a thermal conductivity of at least about 10 W/m/K; and a functional material disposed within at least a portion of the plurality of pores. The functional material has the property of promoting selective transport of at least one species through the membrane structure from the first surface to the second surface.

12 Claims, 7 Drawing Sheets

GAS SEPARATOR APPARATUS

BACKGROUND

The invention relates generally to a membrane based gas separator and more specifically to a membrane based gas separator suitable for high temperature use.

The separation of gases by membranes is a dynamic and a rapidly growing field. Membrane separation processes offer number of advantages in terms of low energy consumption and low capital investments. However, the major challenge in the field of membrane separation is the development of economical and efficient membranes. Especially challenging is the development of membranes for separation of carbon dioxide ($CO_2$) from a gas stream containing molecules such as nitrogen or hydrogen. At present, $CO_2$ is routinely separated from industrial process streams by chemical (amine) or physical (glycol) absorption systems. However, the high energy required to operate such $CO_2$ capture systems may reduce the overall efficiency of the plant, leading to increased fuel requirements, solid wastes, and environmental issues, relative to the base plant without capture. Therefore, it is desirable to develop a membrane suitable for gas separation, and advanced industrial process designs to significantly reduce associated energy requirements.

SUMMARY OF THE INVENTION

The present invention meets these and other needs by providing an efficient separator system for separating components, such as $CO_2$, from gaseous mixtures. Accordingly, one embodiment of the invention is an apparatus for separating at least one component from a mixture of a plurality of chemical species. The apparatus comprises a membrane structure comprising a plurality of pores disposed within a matrix material to allow mass transport from a first surface of the membrane structure to a second surface of the membrane structure. The matrix material has a thermal conductivity of at least about 10 W/m/K; and a functional material disposed within at least a portion of the plurality of pores. The functional material has the property of promoting selective transport of at least one species through the membrane structure from the first surface to the second surface.

A particular embodiment of the invention is a metal membrane structure comprising a plurality of pores. The metal membrane structure facilitates heat transport from a first surface of the membrane structure to a second surface of the membrane structure. A functional material is disposed within at least a portion of the plurality of pores. The functional material has the property of promoting selective transport of $CO_2$ through the membrane structure from the first surface to the second surface.

BRIEF DESCRIPTION OF DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
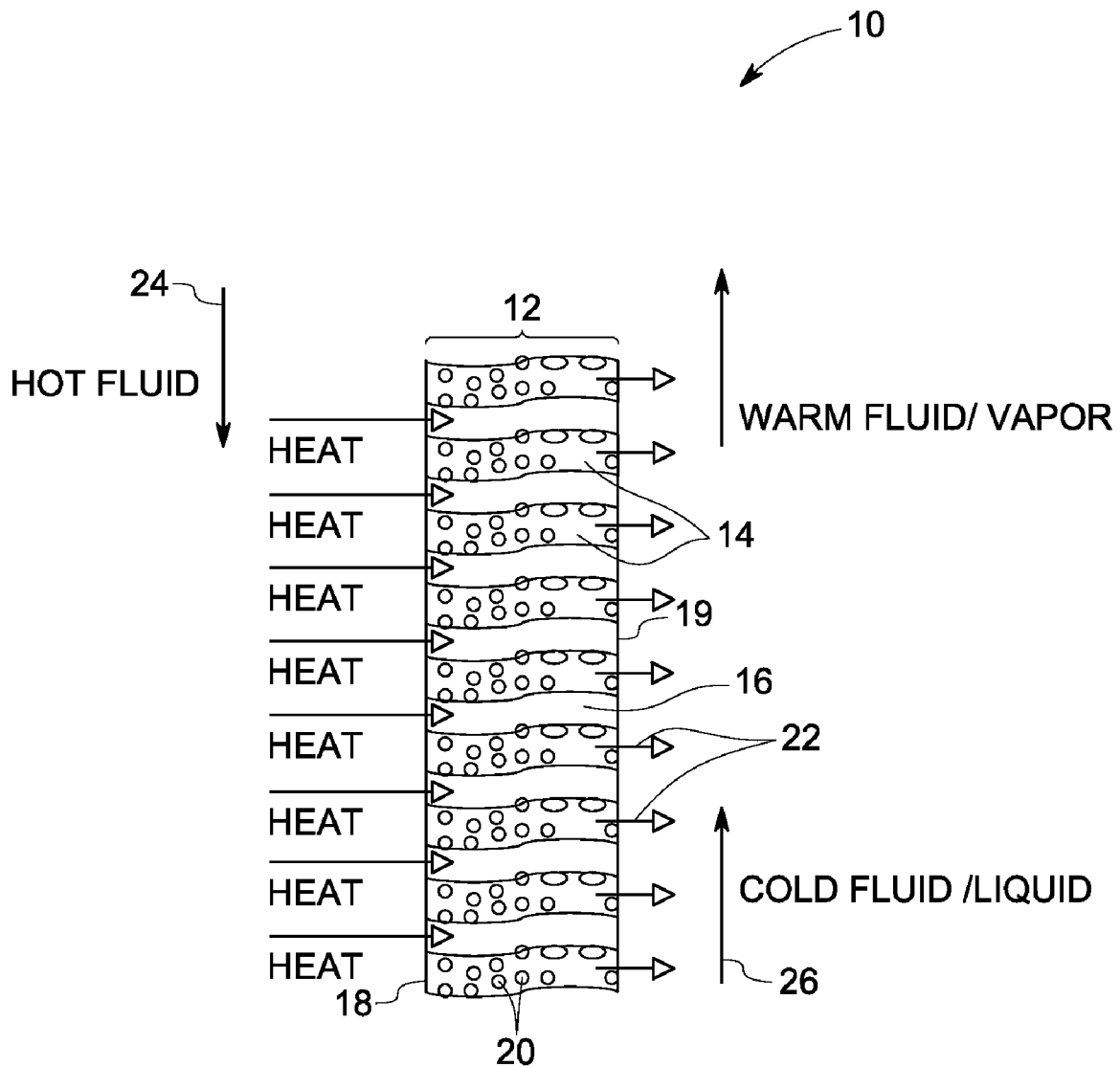
FIG. 1 is a schematic representation of a gas separator incorporating membrane structure of the invention, according to one embodiment of the invention.

In the following description, like reference characters designate like or corresponding parts throughout the several views shown in the figures. It is also understood that terms such as "top," "bottom," "outward," "inward," "first," "second," and the like are words of convenience and are not to be construed as limiting terms. Furthermore, whenever a particular aspect of the invention is said to comprise or consist of at least one of a number of elements of a group and combinations thereof, it is understood that the aspect may comprise or consist of any of the elements of the group, either individually or in combination with any of the other elements of that group.

Referring to the drawings in general, it will be understood that the illustrations are for the purpose of describing one embodiment of the invention and are not intended to limit the invention thereto.

For the purposes of understanding the invention, the term "permeance" refers to permeation rate. "Permselectivity" refers to preferred permeance of one chemical species through the membrane with respect to another chemical species.

An exemplary apparatus 10 for separating at least one component from a mixture of a plurality of chemical species is described with reference to FIG. 1. The apparatus 10 comprises a membrane structure 12 comprising a plurality of pores 14 disposed within a matrix material 16 to allow mass transport from a first surface 18 of the membrane structure to a second surface 19 of the membrane structure. The matrix material 16 has a thermal conductivity of at least about 10 W/m/K. A functional material 20 is disposed within at least a portion of the plurality of pores 14. The functional material 20 has the property of promoting selective transport of at least one species 22, from a mixture of gases 24, through the membrane structure 12, from the first surface 18 to the second surface 19. The separated species 22 may be captured with a sweep gas 26. Typically, the membrane structure 12 comprises a membrane that has a substantially high permselectivity and a substantially high permeability for a selected species to be separated in an efficient manner. In a particular embodiment, the matrix material 16 has a thermal conductivity of at least about 15 W/m/K. In another particular embodiment, the matrix material 16 has a thermal conductivity of at least about 20 W/m/K.

The membrane structure 12 comprises any matrix material 16 having suitable material properties. Desirably, the matrix material 16 is stable at the operating conditions of the apparatus and has the required thermal conductivity. In certain embodiments, the matrix comprises a ceramic with a suitable thermal conductivity. Examples of suitable ceramics include, but are not limited to, aluminum carbide, aluminum nitride, beryllium oxide, boron carbide, boron nitride, cubic boron nitride, hafnium carbide, silicon boride, silicon carbide, silicon nitride, titanium boride, titanium carbide, titanium nitride, and zirconium carbide. The matrix may comprise various combinations of these ceramic materials. In an exemplary embodiment, the matrix comprises silicon carbide.

In certain embodiments, the matrix material 16 comprises a metal. Examples of suitable metals include, but are not limited to, nickel, stainless steel, iron-based alloy, nickel, nickel-based alloy, NiCrAlY, MONEL® (nickel (up to 67 percent by weight), copper, iron, and other trace elements), IN600® (nickel (about 72 percent by weight), chromium (14-17 percent by weight), iron (6-10 percent by weight), manganese (about 1 percent by weight), copper (about 0.5 percent by weight), silicon (0.5 percent by weight), carbon (0.15 percent by weight), sulfur (0.015 percent by weight)), titanium, aluminum-based alloy, copper-based alloy, and various combinations of these. In an exemplary embodiment, the matrix comprises nickel. In another embodiment, the matrix comprises stainless steel.

The membrane structure 12 comprises a plurality of pores 14 disposed within a matrix material 16. The porous matrix facilitates mass transport from a first surface 18 of the membrane structure 12 to a second surface 19 of the membrane structure 12. The dimension of the pores 14 and the density of the pores control the permeance of gas species though the porous membrane structure. Typically, the matrix material 16 has a porosity volume fraction greater than about 5%. In one embodiment, the matrix material 16 has a porosity volume fraction in a range from about 20% to about 70%. In one embodiment, the matrix material 16 has a median pore size in the range from about 0.02 micrometers to about 200 micrometers. In another embodiment, the matrix material 16 has a median pore size in the range from about 0.1 micrometers to about 10 micrometers.

Any method known in the art may be used for making a porous matrix. Powder consolidation and sintering may be used for ceramic and metallic porous matrix materials. Powder consolidation methods may include dry pressing, isopressing, tape casting, or tape calendaring. Pore sizes may be tailored from the powder particle size and morphology. Porosity may be engineering through variations in pressing and sintering conditions or from the use of fugitive pore-forming materials such as organic solvents or materials. Other suitable pore forming techniques include, but are not limited to, ion beam etching, lithography, self assembly, micro machining, anodic etching, replication, investment casting, stamping, soft lithography, electrospinning, laser drilling, and the like. Techniques such as ion beam etching, anodic etching and the like are known to create dense uniform pores of any desired pore sizes. Variations in the process parameters to obtain desired pore structures are apparent to those skilled in the art.

Typically, the functional material 20 is disposed within at least the portion of the plurality of pores 14. The functional material 20 has the property of promoting selective transport of at least one species 22 through the membrane structure 12 from the first surface 18 to the second surface 19. The material choice of the functional material 20, in part, depends on the specific species to be separated, and the operating conditions of the apparatus 10. In certain embodiments, the functional material 20 comprises a porous material. In an alternative embodiment, the functional material 20 comprises a dense material.

The functional material 20 does the selective separation of the selected species and transports it from the first surface 18 to the second surface 19 of the membrane structure 12. Any known mechanism may be involved in the separation process depending on the properties of the permeant and the membrane. Typical separation mechanisms include, but are not limited to, Knudsen diffusion, molecular sieving effects, partial condensation, surface adsorption and diffusion, solution-diffusion, facilitated transport, and the like.

Knudsen diffusion may be the operating mechanism when the pore diameters are small compared to the mean free path of the gas. During Knudsen flow, gas molecules collide with the pore walls more frequently than with other gas molecules. In situations where Knudsen diffusion is the dominant mode of transport, the lighter gas permeates at a rate proportional to the inverse of the square root of the molecular weight ratio of the gases. Molecular sieving effects may be the dominant mechanism for separation, when the pore diameters are in between those of the gas molecules to be separated. Reverse selective gas separation, in which the heavier gas is enriched relative to the level expected for Knudsen selectivity, can be achieved using mechanisms such as preferential adsorption and surface diffusion, solution-diffusion, facilitated transport, and the like. Selective adsorption of the more strongly adsorbed molecule onto the pore surface followed by the surface diffusion of the adsorbed molecule across the pore may also facilitate separation of gases. In certain cases, gas separation may be affected by partial condensation of a selected gas molecule onto the pore surface and subsequent transport of the condensed molecules across the pores. Additional mechanisms for separation include solution-diffusion and facilitated transport. In these processes, the functional material completely fills the pore of the matrix material. Gas transport occurs by dissolution in and diffusion across the functional material. For a solution-diffusion mechanism, the gas dissolves directly in the functional material. For a facilitated transport mechanism, the functional material comprises "carrier species" which interact with the gas. Separation results from the different rates of permeation through the functional material.

In embodiments where the functional material 20 is a porous material, the porous material has pore diameters suitable for the separation of the selected chemical species. Typically, in porous functional materials a narrow pore size distribution is desirable to reduce dispersion. A narrow pore size distribution is defined as average pore size distribution that does not vary by more than about 100% when the average pore size is less than about 50 nanometers, and an average pore size distribution that does not vary by more than about 50% when the average pore size is greater than about 50 nanometers. By the mechanism of molecular sieving, a gas molecule with a smaller kinetic diameter may be selectively separated from gases with larger kinetic diameters. For example, $CO_2$ may be separated preferentially from gases with larger kinetic diameters such as $O_2$, $N_2$, $CH_4$ and $i-C_4H_{10}$. In a particular embodiment, the porous functional material has a median pore diameter of less than about 0.5 nm. In another embodiment, the median pore diameter is less than about 0.35 nanometers. Alternately, the pore size of the functional material may be larger than the kinetic diameter but smaller than the mean free path of the all gas species. Under these conditions, separation occurs by Knudsen diffusion. Examples of porous functional materials include, zeolites and porous ceramics. One skilled in the art may select the zeolite based on its pore size and the kinetic cutoff diameter of the gases to be separated. For example, for $CO_2$ separation, the zeolite may be silicoaluminophosphate SAPO-34 ($Si_xAl_yP_zO_2$, chabasite membrane structure), Na Y-type, DDR (Deca-Dodecasil 3R), mordenite, or MFI (silicalite-1, ZSM-5). Ceramic materials may be silica, titania, zirconia, yttria-stabilized zirconia, or alumina. The pore size may be tailored by synthesis methods such as sol-gel, templated self-assembly, chemical vapor deposition, or anodization.

In other embodiments, the functional material 20 separates gases based on surface selective flow. The functional material 20 within the pores 14 of the matrix material 16 may provide the overall gas selectivity of the membrane. Flow through the membrane structure 12 is due to the sum of contributions from Knudsen flow through the pores 14 and surface flow of adsorbed gas along the pore walls. For these embodiments, where the functional material 20 is disposed within and at least partially filling pores of the membrane, the pore size for Knudsen flow is the effective pore size. The gas selectivity through the membrane is determined by the relative contributions of Knudsen flow and surface diffusion to the total transport of gas. For example, to achieve $CO_2$ selectivity, surface diffusion desirably makes a significant contribution to the total $CO_2$ transport. The rate of surface diffusion depends on the amount of $CO_2$ adsorbed and its relative mobility.

To a first approximation, the surface diffusivity of a gas on a material can be estimated from the heat of adsorption. Since the surface diffusivity varies exponentially with the negative of the heat of adsorption, materials with lower heats of adsorption exhibit higher surface diffusivity. Physically, this means that materials suitable for functional materials have a greater affinity for $CO_2$ than for other gases in the stream, but the affinity for $CO_2$ is not so great that the $CO_2$ binds to the surface without transporting through the pore channel. Low heats of adsorption correspond to weakly bonded $CO_2$, which favors high surface diffusivities. Accordingly, materials that are suitable for use as the functional material 20 are characterized by high surface coverage derivative ($d\theta/dp$) and low heat of adsorption ($\Delta H$). These properties may be determined from $CO_2$ adsorption isotherms of the materials and appropriate materials may be chosen.

The ceramic material for the functional material is selected, in part, depending on the chemical species to be separated. For example, for the separation of $CO_2$, suitable ceramic materials include, but are not limited to, silica, nitrogen containing organo silica, magnesia, calcium oxide, strontium oxide, barium oxide, lanthanum oxide, ceria, titania, hafnia, yttria, vanadium oxide, niobium oxide, tantalum oxide, $ATiO_3$, $AZrO_3$, $AAl_2O_4$, $A^1FeO_3$, $A^1MnO_3$, $A^1CoO_3$, $A^1NiO_3$, $A^2HfO_3$, $A^3CeO_3$, $Li_2ZrO_3$, $Li_2SiO_3$, $Li_2TiO_3$, $Li_2HfO_3$, $A^4N^1_yO_z$, $Y_xN^1_yO_z$, $La_xN^1_yO_z$, and $HfN^2yO_z$, wherein A is La, Mg, Ca, Sr or Ba; $A^1$ is La, Ca, Sr or Ba; $A^2$ is Ca, Sr or Ba; $A^3$ is Sr or Ba; $A^4$ is Mg, Ca, Sr, Ba, Ti or Zr; $N^1$ is V, Nb, Ta, Cr, Mo, W, Mn, Si or Ge; $N^2$ is V, Mo, W or Si; x is 1 or 2; y is in the range from 1 to 3; and z is in the range from 2 to 7. In one embodiment, the ceramic comprises a material selected from the group consisting of silica, nitrogen containing organo silica, magnesia, calcium oxide, strontium oxide, barium oxide, lanthanum oxide, ceria, titania, yttria, $ATiO_3$, $AZrO_3$, $AAl_2O_4$, $A^1FeO_3$, $A^1MnO_3$, $A^1CoO_3$, $A^1NiO_3$, $A_2HfO_3$, $A_3CeO_3$, $Li_2ZrO_3$, $Li_2SiO_3$, and $Li_2TiO_3$; wherein A is Mg, Ca, Sr or Ba; $A^1$ is La, Ca, Sr or Ba; $A^2$ is Ca, Sr or Ba; and $A^3$ is Sr or Ba. In another embodiment, the ceramic comprises a material selected from the group consisting of magnesia, calcium oxide, lanthanum oxide, yttria, ceria, titania, $AAl_2O_4$, $A^1FeO_3$, $ATiO_3$, $AZrO_3$ or a mixture thereof; wherein A is La, Mg, Ca, Sr or Ba; and $A^1$ is La, Ca, Sr or Ba. In an exemplary embodiment, the ceramic comprises a material selected from the group consisting of barium titanate, barium zirconate, and lanthanum ferrate. These oxides show substantially high mobility for surface diffusion of $CO_2$ and hence may provide desirably high permeability.

In certain embodiments, the porous functional material 20 may be further functionalized with some suitable functional groups. For example, amine groups may be dispersed on the pore walls by incorporating compounds with amine groups into a sol-gel precursor solution. Using amine functionalized mesoporous silica, $CO_2/N_2$ selectivities as high as 800 at 100° C. may be achieved. By incorporating amine-modified porous functional ceramics into high thermal conductivity supports, a reduction in membrane flux may be achieved relative to a mesoporous membrane prepared on a ceramic support. The selectivity is retained and thermal conductivity may be improved.

In certain embodiments, the functional material 20 may comprise a polymer. Examples of suitable polymers include, but are not limited to, polymerized ionic liquids, poly(vinylbenzylammonium tetrafluorborate, polynorbornene, polynorbornene-derived polymers, polyacetylene-derived polymers and various combinations thereof. In a particular embodiment, the polymer comprises a polynorbornene-derived polymer. Membranes based on polynorbornene or other high temperature $CO_2/O_2$ selective polymers within thermally conductive metal supports would be of value in an heat recover steam generation (HRSG) system. Such a membrane exhibits high thermal conductivity, allows selective permeation of $CO_2$ over $O_2$ at temperatures of about 100-200° C., and resists hydrothermal degradation in the presence of steam. The thermal conductivity of polymer membranes is typically low, in the range of 0.1 to 1 W/m/K. By disposing the polymer within the pores of a thermally conductive support, the thermal conductivity of the membrane structure may be kept low, while retaining the gas separation selectivity of the polymer.

Polymerized ionic liquids have been demonstrated to be suitable for various gas separation applications. However, many of the polymerized ionic liquid membranes have low thermal conductivity values. The membrane structures described herein, overcome this limitation by disposing the ionic liquid within the pores of a thermally conductive support. This offers an advantage in thermal conductivity while retaining the gas separation selectivity of the polymerized ionic liquid.

In certain embodiments, the functional material 20 comprises an ionogel. The materials comprise an ionic liquid embedded in a ceramic gel. Many ionic liquids have been demonstrated to be suitable for various gas separation applications (see, for example, U.S. Pat. No. 6,579,343). However, membranes comprising ionic liquids dispersed in a porous matrix suffer from problems with stability. Confinement of the ionic liquid in the ceramic gel produces an intermediate state between a liquid and a solid, which offers advantages in stability. Any suitable ionic liquid may be used. In a particular embodiment, the gel comprises a silica gel. The thermal conductivity of silica gels and ionic liquids are typically in the range from about 0.1 W/m/K to about 1 W/m/K. The membrane structures described herein overcome the limitations in stability and thermal conductivity by disposing the ionogel within the pores of a thermally conductive support. Under certain conditions, the membrane structure offers an advantage in thermal conductivity and the ionogel offers the advantage of improved stability while retaining the gas separation selectivity of the ionic liquid.

The functional material 20 may be disposed within the pores 14 of the porous matrix by any known process in the art. Examples of suitable processes include, but are not limited to, thermal evaporation, electron beam evaporation, sputter deposition, spin casting, injection, spray coating, surface-templated sol-gel process, pressure infiltration, electrodeposition, and capillary filling of the functional material. The exact process used depends on the functional material to be disposed, cost, and various other criteria. To best exhibit the gas separation performance of the functional material 20, it is generally desirable to form a deposit that hermetically seals the porous matrix, leaving no gaps between the deposited functional material 20 and the matrix. That is, the deposited functional material occupies the porosity of the matrix in such a way that the fluid communication from one surface 18 of the membrane structure 12 to the other surface 19 occurs only through the functional material 20. The functional material 20 need not completely fill all of the porosity of the porous matrix. The advantage of a low, but hermetic, fill factor is increased flux through the membrane relative to a membrane structure with a high fill factor.

In an exemplary embodiment, the functional material 20 promotes selective transport of $CO_2$ through the membrane structure 12 from the first surface 18 to the second surface 19. In a particular embodiment, the functional material 20 promotes selective transport of $CO_2$ from a mixture of gases. In one embodiment, the functional material 20 promotes selective transport of $CO_2$ from $H_2$ in a fuel gas stream. In one embodiment, the functional material 20 promotes selective transport of $CO_2$ from $N_2$ in an exhaust gas stream. The apparatus may provide purified $CO_2$ (separated from other gases), gas mixture or a liquid enriched in $CO_2$, (for example $CO_2$ in an inert gas or water), or may provide $CO_2$ for any further reaction.

Typically the membrane structure 12 is as thin as possible to enhance heat transmission through the membrane structure 12, and permeation of the selected species; and sufficiently thick to maintain mechanical stability during the operation of the apparatus. For example, the membrane structure 12 has a thickness in the range from about 50 micrometers to about 10 millimeters. The membrane structure 12 has a thickness in the range from about 250 micrometers to about 5 millimeters. Typically the thickness of the membrane structure 12 depends on the specific material of the membrane structure 12 and the fabrication technique. The thickness also depends on the size of the pores 14, for example membrane structures with higher porosity may required to be thicker compared membrane structures with lower porosity. The thickness of the layer of functional material disposed within the pores is preferably as thin as possible to increase the gas permeance while being thick enough to provide a mechanically strong membrane structure. For example, the thickness of the functional material layer is in the range from about 10 nanometers to about 10 microns. In other embodiments, the thickness is in the range from about 50 nanometers to about 500 nanometers.

The materials used in the fabrication of the apparatus facilitate operation of the device at high temperatures. In a particular embodiment, the apparatus 10 operates at a temperature greater than about 200° C. In another embodiment, the apparatus 10 operates at a temperature greater than about 300° C. In another embodiment, the apparatus 10 operates at a temperature greater than about 400° C. As known in the art, Knudsen diffusion, preferential adsorption, surface diffusion, and various other mechanisms depend on the temperature and the pressure difference across the pores. Accordingly, attributes of the membrane structure, such as the functional material used, pore dimensions, are optimized, in part, based on the operating conditions of the apparatus.

The membrane structure 12 may be of any shape, or size depending on the apparatus design. For example, the membrane structure 12 may be in the form of a flat plate, a disc, an undulating plate, or a tube.

Figure 2:
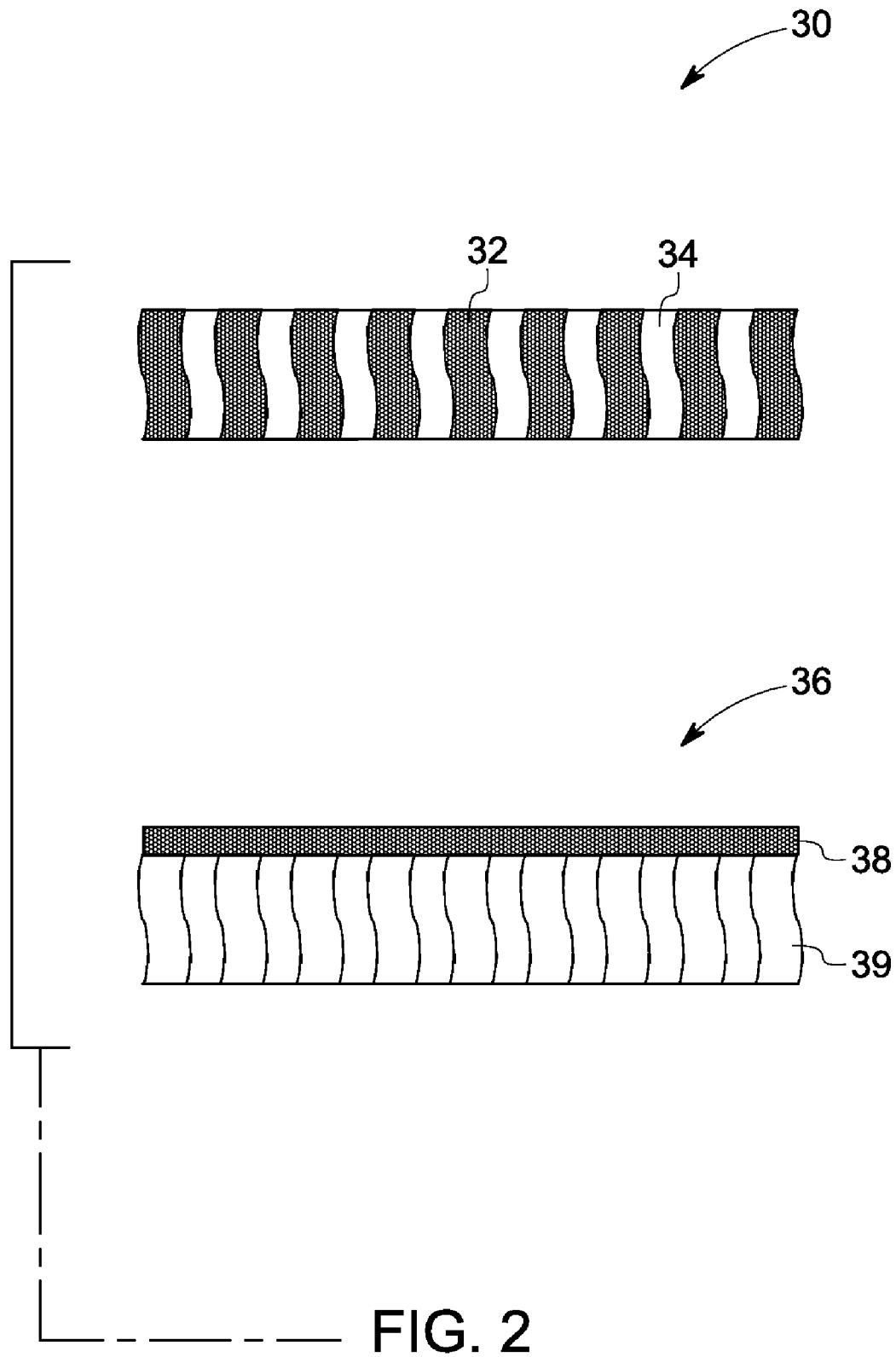
FIG. 2 is schematic representations of composite membrane structure and multilayer membrane structure embodiments of the invention.

The benefits of the membrane structures disclosed herein can be appreciated by comparing the thermal conductivity of such a membrane structure (herein referred to as "composite membrane structure"), to a conventional multilayer membrane structure. As an example, a composite membrane structure 30 with mesoporous silica 32 disposed in a porous stainless steel matrix (herein termed "support") 34 and (b) a multilayer membrane structure 36 comprising a mesoporous silica layer 38 disposed on a porous alumina support 39 are shown in FIG. 2. In each case, the thermal conductivity can be understood in terms of the thermal conductivities of the constituent layers using an equivalent thermal circuit.

Composite membrane structure 30 comprises mesoporous silica 32 deposited within a porous metal support 34. Since the porous metal support 34 provides the mechanical strength of the composite membrane structure 30, the mesoporous silica 32 need only hermetically fill part of the porosity of the support. Since there are parallel paths for heat transfer and the thermal conductivity of mesoporous silica is about 2 orders of magnitude less than that of stainless steel, the thermal conductivity of the composite membrane structure 30 is the thermal conductivity of the support matrix 34, $k_{ss}$, scaled by the solid fraction, $(1-\epsilon_{ss})$, of the porous support matrix 34. (Here, $\epsilon_{ss}$ denotes the void fraction of the porous support matrix 34.) This approximation applies for pre-oxidized metal supports, provided the thickness of the oxide layer is much less than the thickness of the metal support. Substituting representative values for the thermal conductivity of stainless steel ($k_{ss}$~14 W/m/K) and void fraction of the support matrix ($\epsilon_{ss}$ 0.3), the thermal conductivity of the composite membrane structure 30 is simply the thermal conductivity of the porous support matrix, which is about 10 W/m/K.

Multilayer membrane structure 36 comprises a mesoporous silica layer 38 deposited on a porous support 39. As an example, 200 micrometers thick porous alumina support, and a 1 micrometer thick mesoporous silica layer are taken. The membrane structure may comprise multiple sublayers of progressively smaller pore sizes to facilitate a continuous mesoporous silica top layer. For this example, all of the sublayers are assumed to be alumina with a thermal conductivity comparable to half that of dense alumina. The effective thermal conductivity of the multilayer membrane structure 36 is given by:

$$\frac{t_{total}}{k_{eff}} = \frac{t_{SiO2}}{k_{SiO2}} + \frac{t_{support}}{k_{support}} \qquad (1)$$

Here, $t_j$ and $k_j$ refer to the thickness and thermal conductivity of the respective layers. Substituting representative values for the mesoporous silica ($t_{SiO2}$~1 micrometer, $k_{SiO2}$~0.1 W/m/K) and support layers ($t_{support}$~200 micrometers, $k_{support}$~10 W/m/K), the effective thermal conductivity is about 7 W/m/K. For these geometric conditions, the mesoporous silica layer reduces the effective thermal conductivity by about 30% relative to a bare support matrix or a composite membrane structure 30 in which the mesoporous silica is disposed inside the pores. Since the thermal conductivity of the porous alumina is comparable to the porous stainless steel support, quantitatively similar results are expected for a multilayer membrane structure comprising a stainless steel support.

Figure 3:
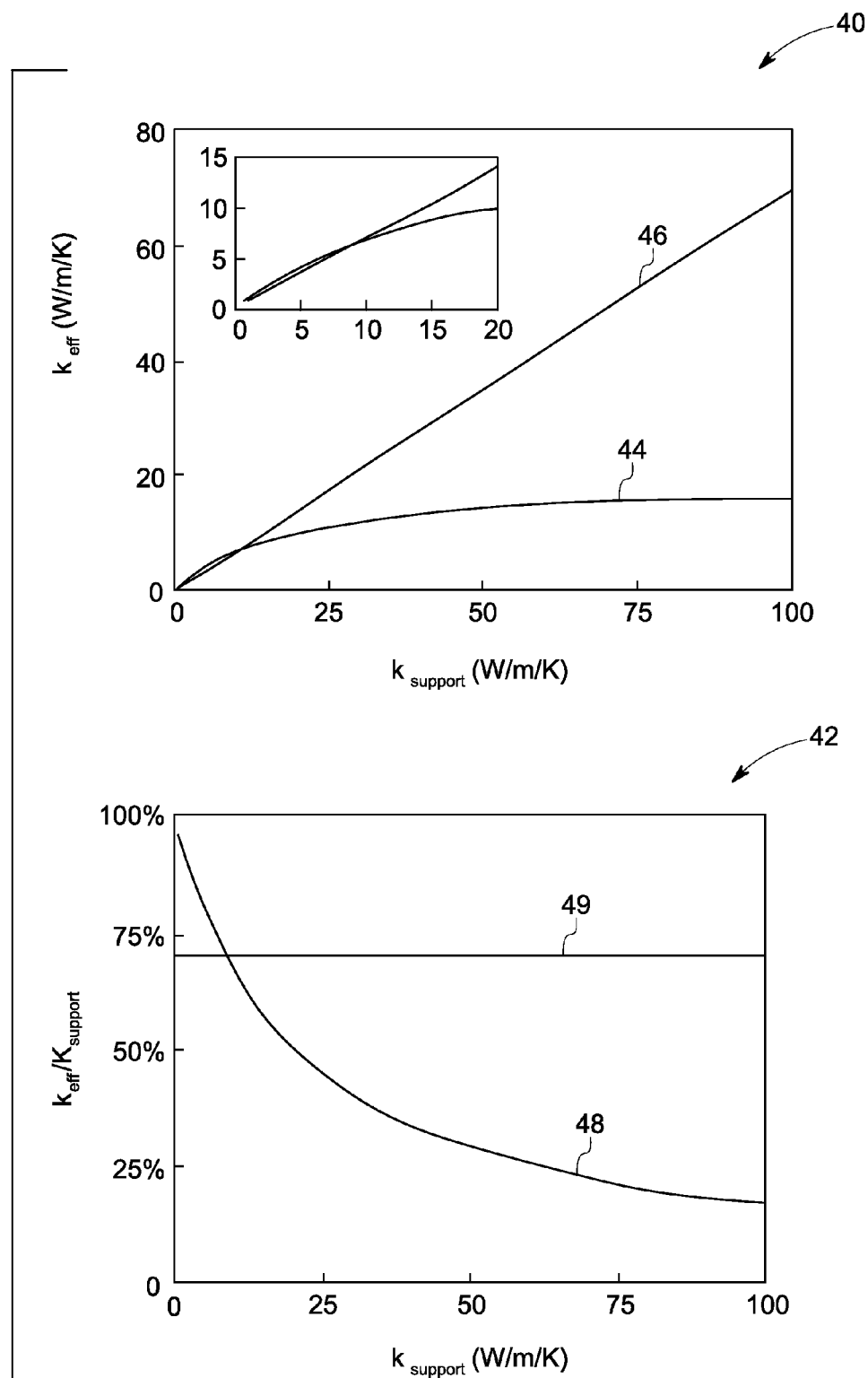
FIG. 3 shows plots of effective thermal conductivity and normalized thermal conductivity for composite membrane structure and multilayer membrane structure embodiments of the invention.

In order to demonstrate the benefits of the membrane structure disclosed herein, relative to the multilayer membrane structure, effective thermal conductivities were computed over a range of values for the support matrix. The calculation assumes a 30% void fraction for the membrane structure. The calculation also assumes a multilayer membrane structure with a 200 micrometers thick support, and a 1 micrometer thick mesoporous silica layer having a thermal conductivity of 0.1 W/m/K. FIG. 3 shows of the effective thermal conductivity (plot 40) and normalized thermal conductivity (plot 42) for the two configurations. When the thermal conductivity of the porous matrix is less than about 9 W/m/K, the multilayer membrane structure has a higher effective thermal conductivity (curve 44). When the thermal conductivity of the matrix is above 9 W/m/K, the composite membrane structure offers higher thermal conductivity (curve 46). Curve 48 is the plot of normalized thermal conductivity for multilayer membrane structure, and curve 49 is the plot of normalized thermal conductivity for composite membrane structure. For example, with porous nickel alloy supports ($k_{support}$~40-70 W/m/K), $k_{eff}$~30-50 W/m/K for the composite membrane structure, compared to $k_{eff}$ of about 15 W/m/K for the multilayer configuration.

In a particular embodiment, the apparatus comprises: a metal membrane structure comprising a plurality of pores to allow mass transport from a first surface of the membrane structure to a second surface of the membrane structure; and a functional material disposed within at least a portion of the plurality of pores. The functional material has the property of promoting selective transport of $CO_2$ through the membrane structure from the first surface to the second surface. The metal matrix material, the pore dimensions, the thickness of the membrane structure, and the functional material may be chosen based on the operating conditions of the apparatus, including as discussed in detail above. The embodiments of the present invention are fundamentally different from those conventionally known in the art. There have been reports of membrane structures including functional materials disposed onto porous metal layers. Disposing the functional material onto porous metal layers drastically reduces the thermal conductivity of the membrane, as explained above. In contrast, membrane structures according to the embodiments of the present invention have functional materials disposed within the pores of high conductivity porous matrix materials. Disposing the functional material within the pores of the matrix material advantageously provide substantially high thermal conductivity for the membrane. Moreover, in a typical gas separation system, the heat exchanger is separate from the gas separation membrane. Combined performance of gas separation and heat transfer functions by a single membrane structure reduces the plant footprint and the capital cost.

Figure 4:
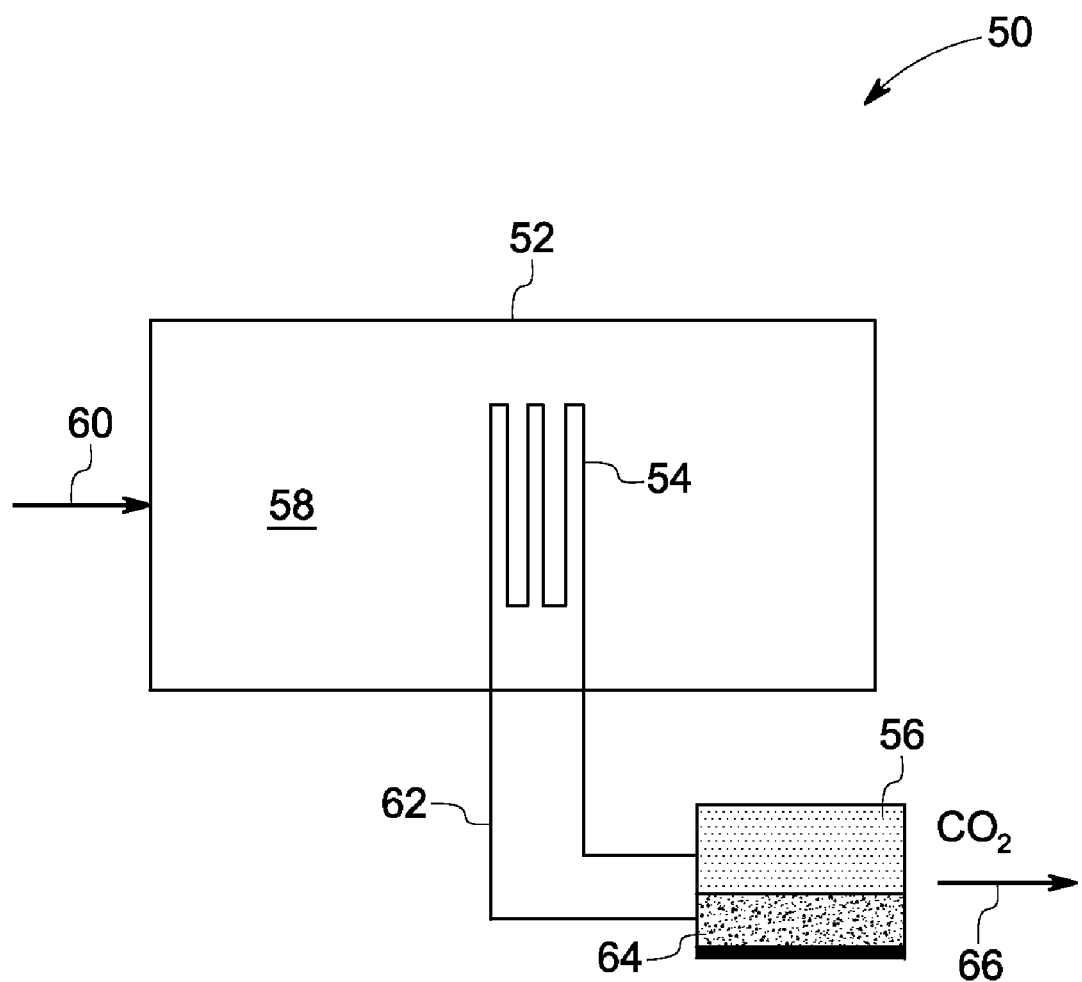
FIG. 4 is a schematic representation of an apparatus according to one embodiment of the present invention.
Figure 5:
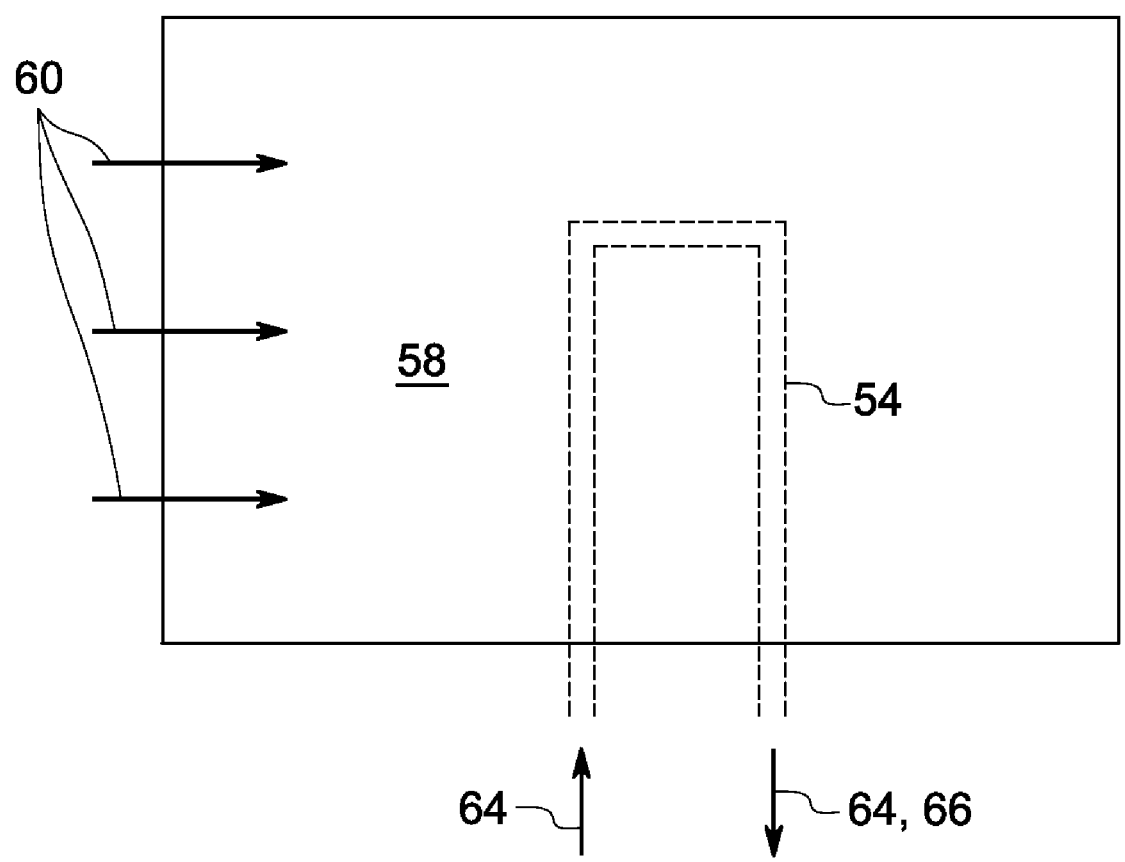
FIG. 5 is a partial view of the embodiment of FIG. 4.

One embodiment of the invention comprises a gas separation system. A typical gas separation system 50 comprises a heat exchanger 52, a separator 54 and a condenser 56, as shown in FIG. 4 and FIG. 5. Heat exchanger 52 comprises a first flow path 58 for directing a fluid comprising the species to be separated 60 therethrough and a second flow path 62, defined at least in part by separator 54, for directing a heat transfer fluid 64 therethrough. In one embodiment, separator 54 comprises the apparatus 10, described above in detail, capable of separating at least one component from a mixture of a plurality of chemical species, described above.

As described in the above embodiments, the apparatus 10 comprises a membrane structure 12 comprising a plurality of pores 14 disposed within a matrix material 16 to allow mass transport from a first surface 18 of the membrane structure 12 to a second surface 19 of the membrane structure 12. The matrix material 16 has a thermal conductivity of at least about 10 W/m/K; and a functional material 20 disposed within at least a portion of the plurality of pores 14. The functional material 20 has the property of promoting selective transport of at least one species 22, from a mixture of gases 24, through the membrane structure 12 from the first surface 18 to the second surface 19. The apparatus performs the dual functions of heat transfer and selected chemical species separation. The membrane structure 12 comprises a matrix material 16 having a substantially high thermal conductivity and facilitates heat transfer, and the functional material disposed within the plurality of pores performs the function of chemical species separation. The matrix material, pore dimensions, thickness of the membrane structure, and the functional material may be chosen based on the chemical species to be separated, and the operating conditions of the apparatus, as discussed in detail above. In an exemplary embodiment, the apparatus 10 comprises a $CO_2$ separation unit. Though in the embodiments of the present invention are explained for $CO_2$ separation, one could envision to have the apparatus modified appropriately for any specific gas species separation as known in the art.

While not to be limited by a particular theory, mechanisms for $CO_2$ selectivity in microporous and mesoporous materials include molecular sieving, surface adsorption and diffusion, and capillary condensation. $CO_2$ can be removed selectively from a stream containing other gas molecules with a larger kinetic diameter, such as $N_2$, through a membrane with sufficiently small pores. A material that has an affinity for $CO_2$ relative to other gases in a stream may show a preferred adsorption and surface diffusion of $CO_2$. Furthermore, the presence of the adsorbed $CO_2$ molecules, through capillary condensation, may effectively block the pore from the more weakly adsorbing gases, thereby hindering their transport. The performance properties of such membranes at a given operating condition can be improved, by a person skilled in the art, by modifying the surface, altering the pore size or changing the composition of the membrane.

Separator 54 physically separates the first flow path 58 and the second flow path 62 and promotes thermal transfer and carbon dioxide transport therebetween. Condenser 56 is in flow communication with the second flow path 62 and receives and condenses the heat transfer fluid 64 to isolate carbon dioxide 66 contained therein.

In one embodiment, the fluid comprising carbon dioxide 60 is an exhaust gas, for example, an exhaust gas having a temperature in the range from about 200° C. to about 700° C. The high temperature exhaust gas 60 is directed into the heat exchanger 52 along the first flow path 58. At least a portion of the second flow path 62 is defined by the separator 54. For example, in one embodiment, second flow path 62 is defined by a piping or a tubing and a portion of that piping or tubing is exposed to the high temperature exhaust gas 60 (i.e. separator 54) and is made of a material with selective permeability of carbon dioxide. Separator 54 is integrated within the carbon dioxide separation system 10 to be in thermal transfer and carbon dioxide transport relationship with the first flow path 58. As separator 54 is exposed to the high temperature exhaust gas 60, at least a portion of the carbon dioxide contained within the exhaust gas 60 is transported through the separator 54 to the heat transfer fluid 64 contained within the second flow path 62. Additionally, the heat transfer fluid 64 extract pulls heat from the exhaust gas and, in turn, undergoes a phase change to a gaseous phase.

The gaseous phase heat transfer fluid 64 containing carbon dioxide is directed to the condenser 56, where the heat transfer fluid 64 is condensed back to a liquid phase and the carbon dioxide 66 is isolated in a gaseous form within the condenser 56. While this invention has been discussed in relation to higher temperature exhaust gas containing carbon dioxide 60, this invention can be utilized with fluids containing carbon dioxide 60 over a wide range of temperatures. This system can be utilized over a wide range of systems for any exhaust gas, for example, furnace exhaust, thermal oxidizers, metal processing, or any other industrial process. In fact, fluids containing carbon dioxide 60 can be at ambient temperature with a suitable phase change heat transfer fluid 64 being selected, for example, a refrigerant, an alcohol like butane, a silicon oil or the like. In addition, while this invention is discussed in relation to $CO_2$ capture systems, a material selective to other constituents within the exhaust gas steam, for example, CO, $NO_x$ or other pollutants or species, may be utilized to capture the other constituents in a similar fashion.

Figure 6:
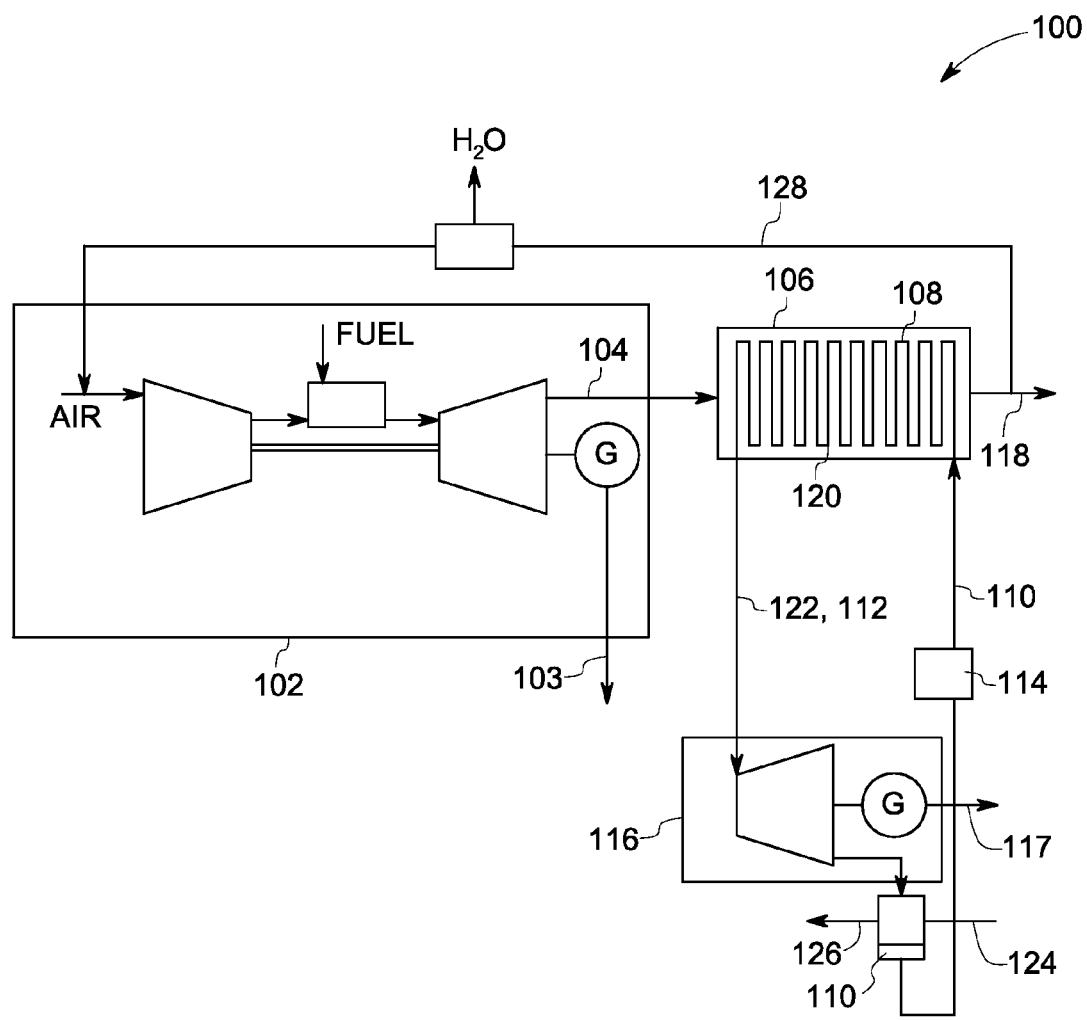
FIG. 6 is a depiction of another embodiment of the instant invention.

A combined cycle $CO_2$ capture system 100 according to one embodiment of the invention is shown in FIG. 6. A typical combined cycle carbon capture system 100 includes an electricity generation system 102, for example a gas turbine, for producing electricity 103 and a high temperature exhaust gas 104. The exhaust gas 104 typically has a temperature in the range from about 500° C. to about 700° C. The high temperature exhaust gas 104 is directed into a heat recovery steam generator (HRSG) 106. The HRSG 106 contains at least one cooling circuit 108. A cooling liquid 110 is directed through cooling circuit 108 by a pump 114 and as the cooling liquid 110 is circulated through the cooling circuit 108, heat is extracted from the high temperature exhaust gas 104 and the cooling liquid 110 undergoes a phase change to produce a vapor phase exhaust 112 that is directed to a steam turbine system 116 to generate additional electricity 117. The high temperature exhaust gas 104 is cooled to a temperature in the range between about 250° C. to about 350° C. prior to exiting the HRSG 106 as a reduced temperature exhaust gas 118.

At least a portion of at least one cooling circuit 108 is a carbon dioxide extraction circuit 120. Carbon dioxide extraction circuit 120 is made of a material with selective permeability of carbon dioxide. As the high temperature exhaust gas 104 travels through the HRSG 106 and contacts the carbon dioxide extraction circuit 120, carbon dioxide 122 is transported through the carbon dioxide extraction circuit 120 into the cooling liquid 110 or vapor 112 that is circulating through the cooling circuit and is directed to the steam turbine system 116 along with the steam 112. In one embodiment, carbon dioxide extraction circuit 120 comprises the apparatus 10, described above in detail, capable of separating $CO_2$ from a mixture of a plurality of chemical species, described above. The mixed flow of steam 112 and $CO_2$ 122 is directed to steam turbine system 116 to generate electricity. The content of the $CO_2$ 122 within the steam turbine system 116 may lead to an improvement in the overall work extracted from the system. The flow exiting steam turbine system 116 is directed to a condenser 124 where the steam 112 is condensed back to water 110, which water 110 is then typically directed back to the HRSG 106. The $CO_2$ 122, is isolated in the condenser 124 and is drawn off along path 126 to be captured, stored, or otherwise utilized.

In one embodiment, a portion 128 of reduced temperature exhaust gas 118 is recycled back to the electricity generation system 102 to increase the overall $CO_2$ content in the exhaust gas 104 to improve the extraction efficiency of the system 100. Ideally, the $CO_2$ content of exhaust gas 104 should be in the range between about 10% by volume to about 15% by volume for improved extraction efficiency through carbon dioxide extraction circuit 120. In order to achieve these levels of $CO_2$ such technologies as exhaust gas recirculation may be employed.

Figure 7:
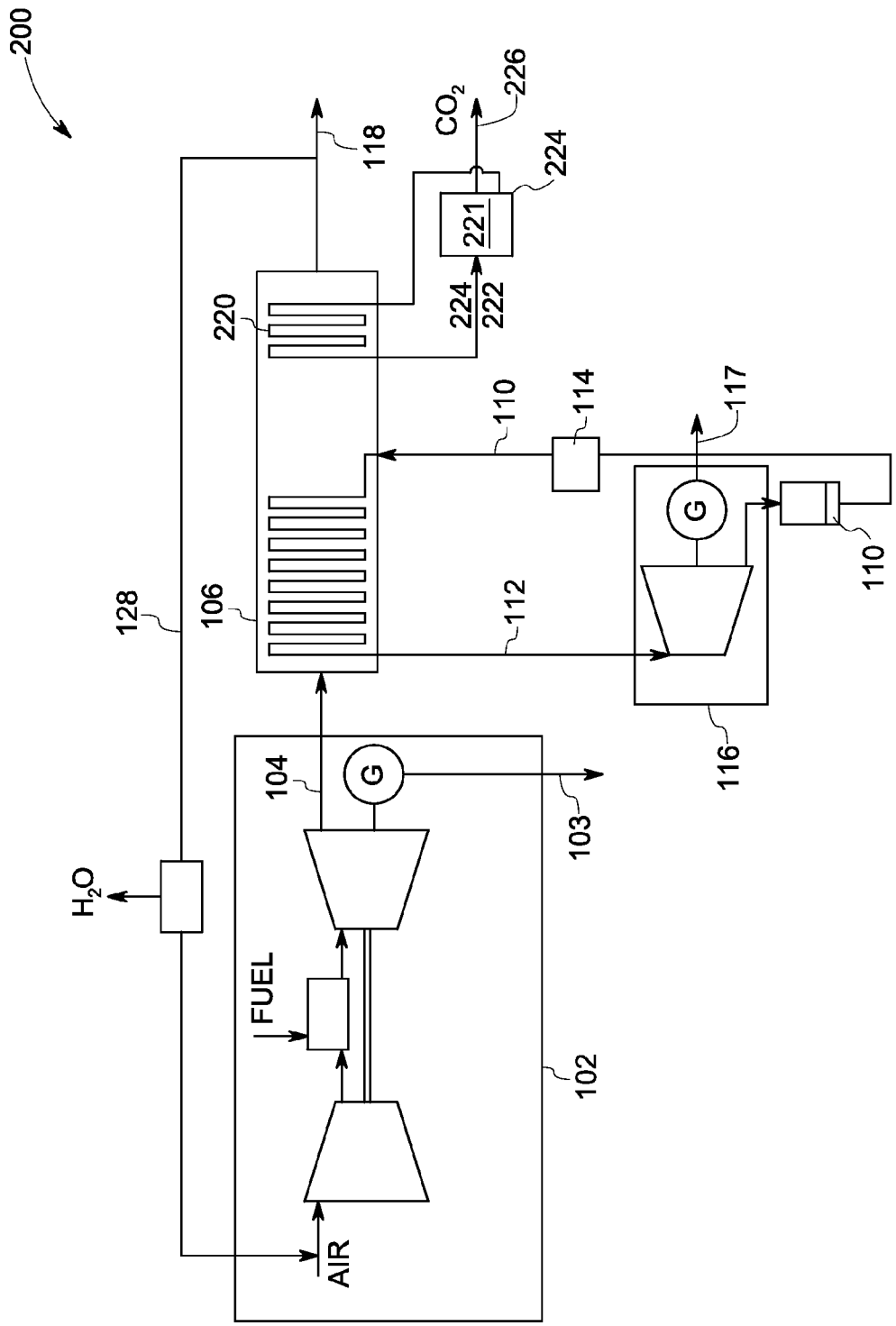
FIG. 7 is a depiction of yet another embodiment of the instant invention.

A retrofitable carbon capture system 200 according to one embodiment of the invention is shown in FIG. 7. Retrofitable carbon capture system 200 includes an electricity generation system 102, for example a gas turbine, for producing electricity 103 and a high temperature exhaust gas 104. The exhaust gas 104 typically has a temperature in the range between about 500° C. to about 700° C. The high temperature exhaust gas 104 is directed into a heat recovery steam generator (HRSG) 106. The HRSG 106 contains at least one cooling circuit 108. Cooling liquid 110 is directed through cooling circuit 108 by a pump 114 and as the cooling liquid 110 is circulated through the cooling circuit 108, heat is extracted from the high temperature exhaust gas 104 and the water 110 undergoes a phase change to produce a vapor phase exhaust 112 that is directed to a steam turbine system 116 to generate additional electricity 117. The high temperature exhaust gas 104 is cooled to a temperature in the range between about 250° C. to about 350° C. prior to exiting the HRSG 106 as a reduced temperature exhaust gas 118.

Retrofitable carbon capture system 200 further comprises a carbon dioxide extraction system 202. Carbon dioxide extraction system 202 includes an extraction circuit 220. In one embodiment, carbon dioxide extraction circuit 220 comprises the apparatus 10, described above in detail, capable of separating $CO_2$ from a mixture of a plurality of chemical species, described above, and a condenser 221. A heat transfer fluid 224 is directed through the carbon extraction circuit 220 and upon exposure to a predetermined temperature of exhaust gas, undergoes a phase change from a liquid to a gaseous phase. As the high temperature exhaust gas 104 travels through the HRSG 106 and contacts the carbon dioxide extraction circuit 220, carbon dioxide 222 is transported through the carbon dioxide extraction circuit 220 into the heat transfer fluid 224 that is circulating through the extraction circuit 220. The mixed flow of heat transfer fluid 224 and $CO_2$ 222 is directed to condenser 221 where the heat transfer fluid 224 is condensed back to a liquid phase. The $CO_2$ 222, is isolated in the condenser 221 and is drawn off along path 226 to be captured, stored, or otherwise utilized.

Retrofitable carbon capture system 200 offers the significant benefit that it can be retrofitted into any installed system for immediate utilization and carbon capture. The heat transfer fluid 224 is selected based on the temperatures that the extraction circuit 220 is exposed to.

While the foregoing embodiments relates to separation of $CO_2$ from gas mixtures, the approach described is capable of removing any selected gas species from other gases. However, the separation mechanism will differ for each gas and hence appropriate selectivity may be achieved through the identification of a suitable membrane structure.

EXAMPLES

The following examples describe the preparation method for making membrane structures.

Example 1

Templated Mesoporous Silica Disposed within a Porous Stainless Steel Membrane Support A porous stainless steel substrate with an average pore size of 0.2 micrometers was provided. The stainless steel support was pre-oxidized in air at 600° C. for 2 hours prior to infiltration by the precursor. The oxidative pre-treatment produces a thin oxide layer on the metal surface that promotes adhesion of silica to the porous metal support. The mesoporous silica deposition was performed by liquid phase infiltration of the silica precursor into the support, followed by heat treatment to convert the precursor into an oxide. Multiple infiltration cycles were used to improve the extent of filling. The precursor solution was prepared by mixing an organic templating agent and a silica precursor in an acidic mixture of ethanol and water. In this example, two representative templates (Brij 56 and Pluronic F127 (products from BASF chemical company)) were used as the templating agent, tetraethylorthosilicate (TEOS) was used as the silica precursor, and hydrochloric acid (HCl) used as the acid. The mass composition of the precursor solution was 1 g template: 2 g HCl (pH of 0.4): 3 g ethanol: 2.55 g TEOS. The support was fully immersed within the solution and a vacuum applied to promote infiltration of the pores within the support. A gel was formed within the pores of the support by evaporation of the volatile components of the precursor solution. The membrane was then heated at 550° C. in air for 2 hours to remove the template. Since heating leads to partial shrinkage of the silica filler, the infiltration cycle was repeated a total of three times to reduce the residual porosity in the membrane. From microscopy analysis, it was found that the mesoporous silica fills over 90% of the porosity of the metal support.

In these membranes, since no gas permeates through the dense metal support, the gas separation capability of the membrane was determined by the gas separation characteristics of the mesoporous silica deposit. For membranes in which the mesoporous silica hermetically fills the cross-sectional area of pores of the metal support, the only contribution to flow occurs through the mesoporous silica. In these cases, the selectivity and flux of the membrane are determined by the selectivity of the mesoporous silica and the flux through the mesoporous silica scaled by the degree of filling of the porous metal support.

F127-templated mesoporous silica membranes produced using the method described in this example exhibited gas separation behavior determined by a Knudsen diffusion mechanism. Alternately, a membrane prepared using Brij 56 as a template exhibited "reverse selectivity". In the case of a membrane prepared using the recipe given in this example, $CO_2$ preferentially permeated due to favorable interactions between the $CO_2$ molecule and surface of the pores. $CO_2$/He selectivities of 2 have been measured for mesoporous silica prepared using the Brij 56 template and the recipe described above.

Example 2

Polynorbornene in Porous Stainless Steel Membrane Support

The polynorbornene was disposed in the porous support. Multiple infiltration steps were used to ensure a hermetic deposit.

The benefit of the invention in thermal conductivity was seen by comparing the thermal conductivity of a membrane structure comprising polynorbornene in a porous nickel alloy support, to a free-standing polymer membrane. Since the porous metal support provides the mechanical strength of the membrane structure, the polynorbornene need only hermetically fill part of the porosity of the support. Since there are parallel paths for heat transfer and the thermal conductivity of polynorbornene is at least 2 orders of magnitude less than nickel alloys (k~40-70 W/m/K), the thermal conductivity of the membrane structure was the thermal conductivity of the support, $k_{Ni}$, scaled by the solid fraction, $1-\epsilon_{ss}$, of the support. This approximation applies for pre-oxidized metal supports, provided the thickness of the oxide layer is much less than the thickness of the metal support. Substituting representative values for the thermal conductivity of the nickel alloy ($k_{Ni}$~40-70 W/m/K) and void fraction of the support ($\epsilon_{ss}$~0.3), the thermal conductivity of the membrane was simply the thermal conductivity of the porous support, which is about 30-50 W/m/K.

Since no gas permeates through the dense metal support, the gas separation capability of the membrane was determined by the gas separation characteristics of the polymer. For membranes in which the polynorbornene completely fills the pores of the metal support, the only contribution to flow occurs through the polynorbornene. In these cases, the selectivity of the membrane is determined by the selectivity of the polynorbornene, the flux was the flux through the polynorbornene scaled by the void fraction of the porous support, and the thermal conductivity determined by the thermal conductivity of the porous stainless steel support.

Example 3

Polymerized Ionic Liquid (Poly(Vinyl Benzyltrimethylammonium Tetrafluoroborate), p[VBTMA][BF4]) in Porous Stainless Steel Membrane Support In this example, a membrane comprising polymerized ionic liquids was disposed within the pores of a porous metal support is described. The deposition was performed by infiltration of a monomer solution into the porous support, followed by in situ polymerization. Optionally, the metal membrane was pre-oxidized and treated with a silane linker molecule to enable covalent linkage of the polymerized ionic liquid to the porous metal support.

The membrane in this example was prepared adding 2 g of p-vinylbenzyltrimethylammonium tetrafluoroborate monomer, 20 mg 2,2'-azobisisobutyronitrile (AIBN), 4 mL N,N-dimethylformamide (DMF) and 3-(trimethylsilyl)propyl methacrylate-treated porous stainless steel membrane to a reaction tube. The tube was sealed, degased under nitrogen, and immersed in an oil bath at 60° C. for 6 h. The membrane was subsequently recovered and dried under vacuum at 60° C. The monomer was prepared by adding 0.12 mol p-vinylbenzyltrimethylammonium chloride, 0.132 mol $NaBF_4$, and 150 mL acetonitrile in a 500 mL round bottom flask. This solution was stirred overnight to dissolve the salt and form a precipitate. The filtrate was concentrated filtrate and poured into ether to precipitate the monomer.

The methacrylate functionalized membrane was prepared by functionalization with 3-(trimethylsilyl)propyl methacrylate. Prior to functionalization, the porous stainless steel membrane was heated in air to 600° C. for 2 hours, cooled to room temperature and soaked in hydrogen peroxide (30%) at room temperature for 1 h, and then dried under vacuum for 3 h. The membrane was then immersed in 115 mM solution of 3-(trimethylsilyl)propyl methacrylate (1 mL) in dry toluene (40 mL) for 2 days. The membrane was dried and then used as in the polymerized ionic liquid synthesis. This procedure covalently attaches chemical groups on the pore surfaces that allow direct grafting of the polymerized ionic liquid to the support. Such an approach improves the adhesion between the components of the membrane.

The benefit of the invention in thermal conductivity was seen by comparing the thermal conductivity of a membrane structure comprising polymerized ionic liquid in a porous stainless steel support to a free-standing polymerized ionic liquid membrane. Since the porous metal support provides the mechanical strength of the membrane structure, the polymerized ionic liquid need only hermetically fill part of the porosity of the support. Since there are parallel paths for heat transfer and the thermal conductivity of polymerized ionic liquid is about 1-2 orders of magnitude less than stainless steel (k~14 W/m/K), the thermal conductivity of the membrane structure is the thermal conductivity of the support, $k_{ss}$, scaled by the solid fraction, $1-\epsilon_{ss}$, of the support. This approximation applies for pre-oxidized metal supports, provided the thickness of the oxide layer is much less than the thickness of the metal support. Substituting representative values for the thermal conductivity of the stainless steel ($k_{ss}$~14 W/m/K) and void fraction of the support ($\epsilon_{ss}$~0.3), the thermal conductivity of the membrane is simply the thermal conductivity of the porous support—about 10 W/m/K.

Since no gas permeates through the dense metal support, the gas separation capability of the membrane is determined by the gas separation characteristics of the polymerized ionic liquid. For membranes in which the polymerized ionic liquid completely fills the pores of the metal support, the only contribution to flow occurs through the polymerized ionic liquid. In these cases, the selectivity of the membrane is determined by the selectivity of the polymerized ionic liquid, the flux is determined by the flux through the polymerized ionic liquid scaled by the void fraction of the porous support, and the thermal conductivity determined by the thermal conductivity of the porous support.

Example 4

Ionogel (bmim/BF4-silica) in Porous Stainless Steel Membrane Support

In this example, an ionogel membrane is described. The membrane was produced by depositing an ionogel comprising an ionic liquid co-synthesized within a silica gel into a porous stainless steel support. The deposition was performed by liquid phase infiltration of a precursor solution into the porous support, followed by gelation of the ionogel.

The ionogel precursor solution was prepared by mixing 1 g of butyl-methyl imidazolium tetrafluoroborate (bmim/BF4) with 3.2 g of formic acid in 4 g of methanol. Under vigorous stirring, 1.6 g of tetramethylorthosilicate (TMOS) was added. After the precursor solution was aged for a predetermined period of time less than a day, the support was fully immersed within the solution. After gelation of the precursor solution, the porous metal support was extracted from the gel. For the recipe described in this example, the gelation time was between 10 and 15 minutes. The membranes comprising ionogels show mass increase preferential adsorption and desorption of $CO_2$.

The permeability of the membrane to $CO_2$ was estimated from the product of the solubility and diffusivity. Quantitative analysis of the transient part of the mass uptake curves indicated that the diffusivity of $CO_2$ in the ionogel is about one-third the diffusivity within bmim/BF4 and the solubility is about an order of magnitude lower. This indicates that the permeability of the membrane is about 30 times lower than the permeability of a supported ionic liquid membrane disposed on a support of comparable porosity.

Although the intrinsic permeability of the ionogel is less than that of an ionic liquid, the overall permeance through a membrane comprising the material may be higher. This feature arises from the mechanical integrity provided by the silica gel. Young moduli in the range of 10-100 MPa and fracture strength in the range of 0.1 to 1 MPa have been reported for ionogels. Since the permeance (and correspondingly, the flux,) through a membrane is determined by the permeability divided by the thickness, differences in permeability are offset by a reduction in the thickness of the "separating" layer needed. It is important to note that the mechanical integrity discussed herein refers to the mechanical integrity needed to prevent the formation of cracks or bypass defects in the porous support. The overall mechanical properties of the membrane are determined by the support and may substantially exceed the mechanical properties of the ionogel.

The benefits of the invention in thermal conductivity can be seen by comparing the thermal conductivity of a membrane structure comprising an ionogel in a porous stainless steel support to a multilayer membrane structure comprising a free-standing ionogel. Since the porous metal support provides the mechanical strength of the membrane structure, the ionogel need only hermetically fill part of the porosity of the support. Since there are parallel paths for heat transfer and the thermal conductivity of the ionogel is about an orders of magnitude less than stainless steel (k~14 W/m/K), the thermal conductivity of the membrane structure is the thermal conductivity of the support, $k_{ss}$, scaled by the solid fraction, $1-\epsilon_{ss}$, of the support. This approximation applies for pre-oxidized metal supports, provided the thickness of the oxide layer is much less than the thickness of the metal support. Substituting representative values for the thermal conductivity of the stainless steel ($k_{ss}$~14 W/m/K) and void fraction of the support ($\epsilon_{ss}$~0.3), the thermal conductivity of the membrane is simply the thermal conductivity of the porous support, which is about 10 W/m/K.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An apparatus for separating at least one component from a mixture of a plurality of chemical species, the apparatus comprising:
   a membrane structure comprising a plurality of pores disposed within a matrix material to allow mass transport from a first surface of the membrane structure to a second surface of the membrane structure, wherein the matrix material comprises a metal selected from the group consisting of nickel, stainless steel, iron-based alloy, nickel-based alloy, NiCrAlY, titanium, aluminum-based alloy, and copper-based alloy, wherein the matrix material has a thermal conductivity of greater than or equal to 10 W/m/K; and a functional material disposed within at least a portion of the plurality of pores, wherein the functional material has the property of promoting selective transport of at least one species through the membrane structure from the first surface to the second surface, wherein the functional material comprises a ceramic selected from the group consisting of magnesia, calcium oxide, strontium oxide, barium oxide, lanthanum oxide, ceria, titania, hafnia, yttria, vanadium oxide, niobium oxide, tantalum oxide, $ATiO_3$, $AZrO_3$, $AAl_2O_4$, $A^1FeO_3$, $A^1MnO_3$, $A^1CoO_3$, $A^1NiO_3$, $A^2HfO_3$, $A^3CeO_3$, $Li_2ZrO_3$, $Li_2SiO_3$, $Li_2TiO_3$, $Li_2HfO_3$, $A^4N^1_yO_z$, $Y_xN^1_yO_z$, $La_xN^1_yO_z$, and $HfN^2_yO_z$,
wherein A is La, Mg, Ca, Sr or Ba;
   $A^1$ is La, Ca, Sr or Ba;
   $A^2$ is Ca, Sr or Ba;
   $A^3$ is Sr or Ba;
   $A^4$ is Mg, Ca, Sr, Ba, Ti or Zr;
   $N^1$ is V, Nb, Ta, Cr, Mo, W, Mn, Si or Ge;
   $N^2$ is V, Mo, W or Si;
   x is 1 or 2;
   y is in the range from 1 to 3; and
   z is in the range from 2 to 7.

2. The apparatus of claim 1, wherein the metal comprises stainless steel.

3. The apparatus of claim 1, wherein the matrix has a porosity volume fraction greater than about 5%.

4. The apparatus of claim 1, wherein the matrix has a porosity volume fraction in a range from about 20% to about 70%.

5. The apparatus of claim 1, wherein the matrix has a median pore size in the range from about 0.02 micrometers to about 200 micrometers.

6. The apparatus of claim 1, wherein the matrix has a median pore size in the range from about 0.1 micrometer to about 10 micrometer.

7. The apparatus of claim 1, wherein the matrix has a thickness in the range from about 50 micrometers to about 10 millimeters.

8. The apparatus of claim 1, wherein the matrix has a thickness in the range from about 250 micrometers to about 5 millimeters.

9. The apparatus of claim 1, wherein the functional material promotes selective transport of $CO_2$ through the membrane structure from the first surface to the second surface.

10. An apparatus for separating at least one component from a mixture of a plurality of chemical species, the apparatus comprising:
a metal membrane structure comprising a plurality of pores to allow heat transport from a first surface of the membrane structure to a second surface of the membrane structure, wherein the metal membrane structure comprises a metal selected from the group consisting of nickel, stainless steel, iron-based alloy, nickel-based alloy, NiCrAlY, titanium, aluminum-based alloy, and copper-based alloy; and
a functional material disposed within at least a portion of the plurality of pores, wherein the functional material has the property of promoting selective transport of $CO_2$ through the membrane structure from the first surface to the second surface, wherein the functional material comprises a ceramic selected from the group consisting of magnesia, calcium oxide, strontium oxide, barium oxide, lanthanum oxide, ceria, titania, hafnia, yttria, vanadium oxide, niobium oxide, tantalum oxide, $ATiO_3$, $AZrO_3$, $AAl_2O_4$, $A^1FeO_3$, $A^1MnO_3$, $A^1CoO_3$, $A^1NiO_3$, $A^2HfO_3$, $A^3CeO_3$, $Li_2ZrO_3$, $Li_2SiO_3$, $Li_2TiO_3$, $Li_2HfO_3$, $A^4N^1_yO_z$, $Y_xN^1_yO_z$, $La_xN^1_yO_z$, and $HfN^2_yO_z$, wherein A is La, Mg, Ca, Sr or Ba;
$A^1$ is La, Ca, Sr or Ba;
$A^2$ is Ca, Sr or Ba;
$A^3$ is Sr or Ba;
$A^4$ is Mg, Ca, Sr, Ba, Ti or Zr;
$N^1$ is V, Nb, Ta, Cr, Mo, W, Mn, Si or Ge;
$N^2$ is V, Mo, W or Si;
x is 1 or 2;
y is in the range from 1 to 3; and
z is in the range from 2 to 7.

11. An apparatus for separating at least one component from a mixture of a plurality of chemical species, the apparatus comprising:
a membrane structure comprising a plurality of pores disposed within a matrix material to allow mass transport from a first surface of the membrane structure to a second surface of the membrane structure, wherein the matrix material has a thermal conductivity of at least 10 W/m/K; wherein the matrix material comprises a metal selected from the group consisting of nickel, stainless steel, iron-based alloy, nickel-based alloy, NiCrAlY, titanium, aluminum-based alloy, and copper-based alloy, and a functional material disposed within at least a portion of the plurality of pores within the metal, wherein the functional material has the property of promoting selective transport of at least one species through the membrane structure from the first surface to the second surface, wherein the functional material comprises an ionogel, or polynorbornene.

12. An apparatus for separating at least one component from a mixture of a plurality of chemical species, the apparatus comprising:
a metal membrane structure comprising a plurality of pores to allow heat transport from a first surface of the membrane structure to a second surface of the membrane structure; and
a functional material disposed within at least a portion of the plurality of pores within the metal of the membrane structure, wherein the functional material has the property of promoting selective transport of $CO_2$ through the membrane structure from the first surface to the second surface, wherein the functional material has the property of promoting selective transport of at least one species through the membrane structure from the first surface to the second surface, wherein the functional material comprises an ionogel, or polynorbornene.

* * * * *

UNITED STATES PATENT AND TRADEMARK OFFICE
CERTIFICATE OF CORRECTION

| | | |
|---|---|---|
| PATENT NO. | : 8,043,418 B2 | Page 1 of 1 |
| APPLICATION NO. | : 11/608292 | |
| DATED | : October 25, 2011 | |
| INVENTOR(S) | : Ruud et al. | |

It is certified that error appears in the above-identified patent and that said Letters Patent is hereby corrected as shown below:

In Column 8, Line 25, delete "($\epsilon_{ss}$0.3),"  and insert -- ($\varepsilon_{ss} \sim 0.3$) --, therefor.

Signed and Sealed this
Nineteenth Day of June, 2012

David J. Kappos
*Director of the United States Patent and Trademark Office*